V. A. FYNN.
POWER TRANSMISSION AND CONTROL.
APPLICATION FILED MAY 1, 1916.

1,321,616.

Patented Nov. 11, 1919.
2 SHEETS—SHEET 1.

WITNESS
W. H. Alexander.

INVENTOR
Valèn A. Fynn
BY
E. E. Hamm
ATTORNEY

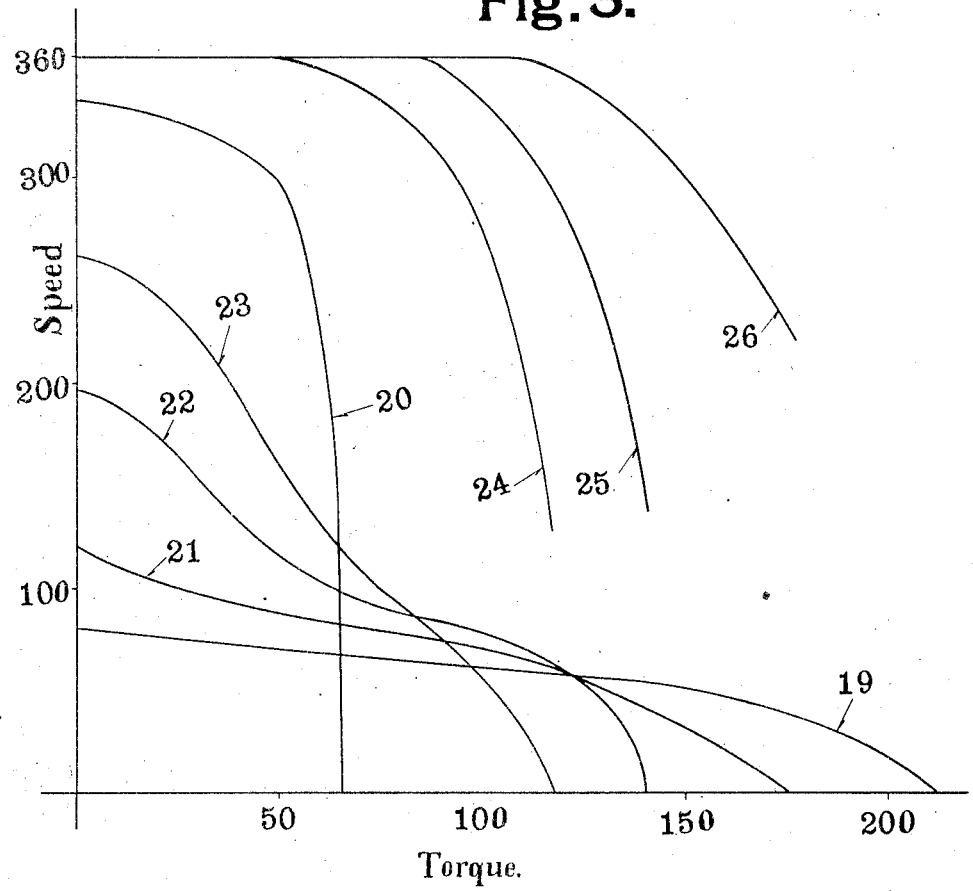

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

POWER TRANSMISSION AND CONTROL.

1,321,616.      Specification of Letters Patent.      Patented Nov. 11, 1919.

Application filed May 1, 1916. Serial No. 94,653.

*To all whom it may concern:*

Be it known that I, VALÈRE A. FYNN, a subject of the King of England, residing at the city of St. Louis, State of Missouri, United States of America, have invented a certain new and useful Power Transmission and Control, of which the following is such a full, clear, and exact description as will enable any one skilled in the art to which it appertains to make and use the same, reference being had to the accompanying drawings, forming part of this specification.

My invention relates to the transmission of power and the control thereof, more particularly in connection with self-propelled vehicles in which the prime mover is an internal combustion engine.

Because the torque of an internal combustion engine is very small at low speeds, reaches a maximum with increasing speed, and then diminishes again, it has been found necessary to change the gear ratio between the engine and the wheels, in order to start such vehicles, to drive them over heavy roads or up steep grades. This change is usually carried out by means of a hand-operated gear shifting lever. In order to dispense with this lever and gearing and the disadvantages connected therewith, and in order, also, to increase the number of available gear ratios between engine and wheels, the substitution of electromagnetic variable ratio transmission apparatus for the mechanical gearing has heretofore been proposed.

My invention relates to improvements in such electromagnetic transmission apparatus, and has for its object to greatly simplify the necessary operations and the apparatus with which they are to be carried out.

Figure 1:
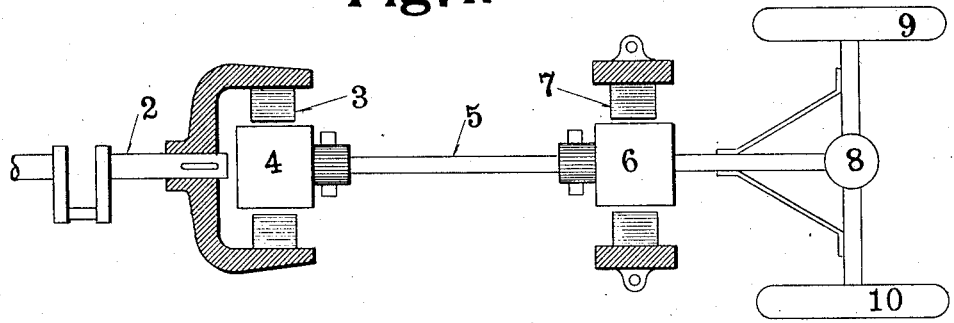
Figure 2:
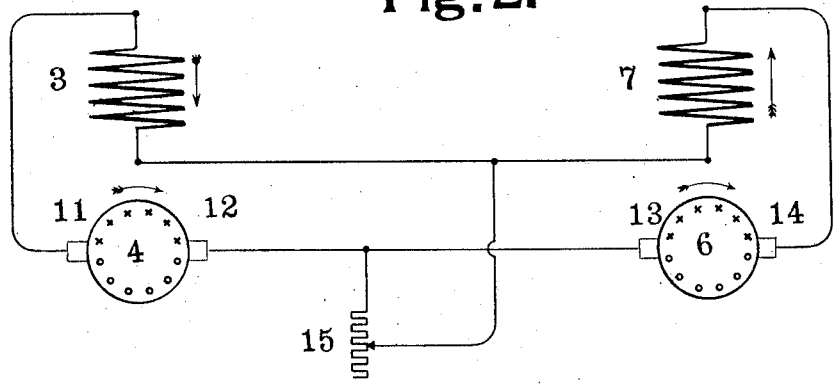

My invention will be better understood by reference to the accompanying drawings, in which Figure 1 is a diagrammatic representation of a known form of electromagnetic transmission to which my invention can be applied. Fig. 2 shows one embodiment of said invention, and Fig. 3 illustrates the results obtained in actual practice by the use of that form of the invention which is shown in Fig. 2.

Referring to the drawings, I will more particularly describe my invention as applied to that form of electromagnetic transmission which is shown in Fig. 1. In this figure, 2 represents the engine shaft to which is coupled the field structure 3 of a dynamo electric machine the armature 4 of which is coupled to the shaft 5 which drives the vehicle wheels 9, 10, through the differential 8. To this shaft is also coupled the armature 6 of a second dynamo electric machine the field structure 7 of which is attached to the vehicle frame and is prevented from revolving about the armature 6 with which it coöperates. In order to operate such a transmission, the two dynamo electric machines are usually connected in series, and means are provided for varying the field ampere turns of the generator, as well as those of the motor. The term "generator" is usually applied to that dynamo electric machine both members of which are rotatable, and the term "motor" to the one in which one of the members is stationary. In order to reduce the wheel speed and increase the torque exerted by the latter, without being obliged to change the speed of the engine, it is necessary to increase the motor excitation. The same result can, however, to some extent, be achieved by decreasing the generator excitation, the effect in this case being limited by the fact that a decrease of the generator excitation will necessarily decrease the amount of power transmitted. The two methods can also be combined, in order to achieve the desired results. After the driven shaft has reached a sufficiently high speed, it is usual to rely on the generator only and make use of it as a dynamo electric coupling by short circuiting same on itself. In order to apply this known form of control, it is necessary to make use of somewhat complicated switches and sometimes of several sets of adjustable resistances.

In carrying my invention into practice, I so proportion the generator and motor windings as to secure the maximum locked torque and the slowest revolution of the wheels 9, 10 when the windings of said machines are connected in series, as shown in Fig. 2, and the auxiliary circuit including the resistance 15 is open. In order to gradually increase the speed of the driven shaft and reduce the maximum torque it exerts, I connect the resistance 15 across the terminals of the two machines, and gradually reduce same until it is entirely cut out, at which time the motor will be idle and the generator will be acting as a dynamo electric coupling, transmitting the engine power to the wheels with but a negligible slip. In other words, I achieve my object by dimensioning both machines for the lowest speed and maximum torque of the wheels, and varying said torque and speed by creating a shunt to the generator which includes a power consuming device, and by varying the amount of power consumed thereby.

Fig. 3 shows the result of an actual test of that form of the invention which is shown in Fig. 2. In this figure, the foot pounds torque developed at the wheels is plotted against the speed of said wheels. With the generator and motor connected as shown in Fig. 2, and with a shunt of infinite resistance across the terminals of the generator, the obtainable performance is shown by curve 19. It is seen that when the driven shaft is allowed to run free, it reaches a speed of about 80 revolutions. When locked, its speed is, of course, zero, and it develops a torque of 212 foot pounds. At intermediate speed the torque values are as shown by the curve. The performance of the machine with .75 of an ohm in the shunt across the generator terminals is shown by the curve 21. It is seen that the locked torque is now but 176 foot pounds, while the free speed of the wheels has risen to 118 revolutions. With .44 of an ohm in the shunt across the generator, the maximum or locked torque is 141 foot pounds and the free speed is 196 revolutions, as shown by curve 22. With .3 of an ohm in the generator shunt, the locked torque is 118 foot pounds, and the free speed is 262 revolutions, as shown by curve 23. With the generator short circuited, that is with all the resistance 15 cut out of the shunt circuit, the generator acts as a coupling, develops a locked torque of 65 foot pounds and the free speed of the wheels rises to 338 revolutions. All these curves were obtained by keeping the engine speed constant as long as possible. After a condition was reached where the fuel valve was fully open, the speed of the engine decreased, as indicated by the curves, 24, 25 and 26, for the three values of the shunting resistance used for the curves 23, 22 and 21 respectively.

Fig. 3 shows that the present invention makes it possible to gradually go from the lowest speed to direct drive with but little loss and by means of extremely simple and easily handled apparatus.

Having fully described my invention, what I claim as new and desire to secure by Letters Patent of the United States is:

1. In an apparatus of the character described, the combination of a prime mover, a driven shaft, a generator having one element driven by the prime mover and the other mechanically connected to the driven shaft, a motor connected to receive electrical energy from the generator and having one element mechanically connected to the driven shaft, an auxiliary circuit connected to the terminals of the generator in parallel with the motor, and means in said circuit for varying the amount of energy consumed thereby.

2. In an apparatus of the character described, the combination of a prime mover, a driven shaft, a generator having one element driven by the prime mover and the other mechanically connected to the driven shaft, a motor connected to receive electrical energy from the generator and having one element mechanically connected to the driven shaft, and means for diverting from the motor a variable portion of the current produced by the generator.

3. In an apparatus of the character described, the combination of a prime mover, a driven shaft, a generator having one element driven by the prime mover and the other mechanically connected to the driven shaft, a motor connected to receive electrical energy from the generator and having one element mechanically connected to the driven shaft, and an adjustable resistance connected to the terminals of the generator in parallel with the motor.

4. In an apparatus of the character described, the combination of a prime mover, a driven shaft, a series generator having one element driven by the prime mover and the other mechanically connected to the driven shaft, a series motor connected to receive electrical energy from the generator and having one element mechanically connected to the driven shaft, an auxiliary circuit connected to the terminals of the generator in parallel with the motor, and means in said circuit for varying the amount of energy consumed thereby.

5. In an apparatus of the character described, the combination of a prime mover, a driven shaft, a series generator having one element driven by the prime mover and the other mechanically connected to the driven shaft, a series motor connected to receive electrical energy from the generator and having one element mechanically connected to the driven shaft, and an adjustable resistance connected to the terminals of the generator in parallel with the motor.

6. In an apparatus of the character described, the combination of a prime mover, a driven shaft, a generator having one element driven by the prime mover and the other mechanically connected to the driven shaft, a motor connected to receive electrical energy from the generator and having one element mechanically connected to the driven shaft, means for diverting from the motor a portion of the current produced by the generator, and means for short circuiting the generator.

7. In an apparatus of the character described, the combination of a prime mover, a driven shaft, a generator having one element driven by the prime mover and the other mechanically connected to the driven shaft, a motor connected to receive electrical energy from the generator and having one element mechanically connected to the driven shaft, a power consuming circuit connected to the terminals of the generator in parallel with the motor, and a controller for varying the amount of power consumed by said circuit and short circuiting the generator.

8. In an apparatus of the character described, the combination of a prime mover, a driven shaft, a generator having one element driven by the prime mover and the other mechanically connected to the driven shaft, a motor connected to receive electrical energy from the generator and having one element mechanically connected to the driven shaft, and an adjustable power consuming device connected to the generator in parallel with the motor.

9. In an apparatus of the character described, the combination of a prime mover, a driven shaft, a series generator having one member driven by the prime mover and the other connected to the driven shaft, a series motor in circuit with the generator and having one member connected to the prime mover, an auxiliary circuit, means for connecting said circuit to the generator in parallel with the motor, and means in said circuit for varying the amount of energy consumed thereby, the relation between the field ampere turns of the generator and motor being such that their maximum combined torque is developed when the auxiliary circuit is open.

10. In power transmission apparatus, the combination of two dynamo electric machines, a driven shaft, a mechanical connection between one element of each dynamo electric machine and the driven shaft, electrical connections to transfer energy from an element of one dynamo electric machine to an element of the other dynamo electric machine, an auxiliary circuit connected to the terminals of the interconnected elements of the dynamo electric machines, and means for varying the amount of power consumed in said auxiliary circuit.

In testimony whereof, I have hereunto set my hand and affixed my seal.

VALÈRE A. FYNN. [L. S.]